United States Patent [19]

Robertson, Jr. et al.

[11] Patent Number: 5,950,417
[45] Date of Patent: Sep. 14, 1999

[54] TOPPING COMBUSTOR FOR LOW OXYGEN VITIATED AIR STREAMS

[75] Inventors: Arichbald Stuart Robertson, Jr., Whitehouse Station; Chongqing Lu, East Hanover; Zhen Fan, Parsippany, all of N.J.

[73] Assignee: Foster Wheeler Energy International Inc., Clinton, N.J.

[21] Appl. No.: 09/045,178

[22] Filed: Mar. 20, 1998

Related U.S. Application Data

[63] Continuation-in-part of application No. 08/684,038, Jul. 19, 1996, abandoned.

[51] Int. Cl.⁶ .................... F02C 7/26; F02C 9/00
[52] U.S. Cl. .................. 60/39.06; 60/39.23; 60/733; 60/746
[58] Field of Search ................ 60/39.06, 39.12, 60/39.23, 39.29, 39.463, 732, 733, 737, 746, 757, 760

[56] References Cited

U.S. PATENT DOCUMENTS

| | | | |
|---|---|---|---|
| 4,054,028 | 10/1977 | Kawaguchi | 60/39.23 |
| 4,255,506 | 3/1981 | Wilkes et al. | |
| 4,787,208 | 11/1988 | De Corso | |
| 4,845,940 | 7/1989 | Beer | |
| 4,999,993 | 3/1991 | Rao | |
| 5,161,367 | 11/1992 | Scalzo | |
| 5,218,815 | 6/1993 | Korenberg | |
| 5,261,226 | 11/1993 | Pillsbury | |
| 5,285,628 | 2/1994 | Korenberg | 60/39.06 |
| 5,388,395 | 2/1995 | Scharpf et al. | |
| 5,408,825 | 4/1995 | Foss et al. | |
| 5,413,879 | 5/1995 | Domeracki et al. | |
| 5,459,994 | 10/1995 | Drnevich | |
| 5,473,881 | 12/1995 | Kramnik et al. | 60/39.06 |

*Primary Examiner*—Charles G. Freay
*Attorney, Agent, or Firm*—Martin Smolowitz

[57] ABSTRACT

A multi-stage topping combustor unit having rich burn, and lean burn zones followed by a quench/dilution zone. Combustible fuel gas is supplied only to the rich burn zone, and an oxygen-containing air-flue gas mixture is supplied to all three zones in a fixed flow proportioning that establishes a desired temperature profile through the combustor unit that minimizes combustor NOx and CO emissions. The combustor unit casing is cooled by an augmented air and oxygen stream discharged into the rich burn zone only, or into both the rich and lean burn zones. The cooling air flow is regulated by a control device/valve that allows the cooling air flow, and hence the augmenting oxygen entering the rich burn zone or the rich and lean burn zones, to be reduced as the fuel gas flow/firing temperature is reduced. The concurrent reduction of the cooling air and fuel gas flows enables the combustor unit temperature distribution and NOx and CO emissions to be controlled as gas turbine firing temperature and power output are reduced.

10 Claims, 3 Drawing Sheets

TOPPING COMBUSTOR FOR LOW OXYGEN VITIATED AIR STREAMS

This application is a continuation-in-part of application Ser. No. 08/684,038 filed on Jul. 19, 1996 now abandoned.

BACKGROUND OF INVENTION

This invention pertains to gas turbine power producing plants incorporating fuel rich-lean burn topping combustors that require control of the rich-lean burn zone temperatures to minimize the combustor emissions of nitrogen oxides and carbon monoxide from the combustor. It pertains particularly to second-generation pressurized fluidized bed combustor power plants in which a rich-lean burn topping combustor unit is used to burn a fuel gas with vitiated air (an air-flue gas mixture) for gas turbine power output.

Topping combustor units used in pressurized fluidized bed combustion processes for producing power are generally known. For example, U.S. Pat. No. 4,787,208 to DeCorso discloses a low-NOx rich-lean combustor suitable for use with a combustion gas turbine. U.S. Pat. No. 4,845,940 to Beer discloses a low-NOx rich-lean combustor containing concentric annular passages and useful in gas turbines. U.S. Pat. No. 5,161,367 to Scalzo discloses a coal-fired gas turbine system with an internal topping combustor; U.S. Pat. No. 5,218,815 to Korenberg discloses a gas turbine power cycle which burns solid fuel such as coal in a carbonizer and a char combustor in combination with a topping combustor upstream of the gas turbine to produce shaft power. Also U.S. Pat. No. 5,255,506 to Wilkes et al; and U.S. Pat. No. 5,261,226 to Pillsburg each disclose gas turbine power systems which utilize topping combustors. However, further improvements to such combustion units are needed so as to achieve reduced NOx and CO emissions and provide increased thermal efficiency and reduced costs for solid fuel combustion power generating plants.

SUMMARY OF INVENTION

This invention provides an improved fuel rich-lean burn combustor unit used for heating gases to desired combustion gas turbine inlet temperatures as particularly used in advanced/second-generation pressurized fluidized bed combustion (PFBC) power plants. The gases being combusted and heated consist of a combustible fuel gas and an oxygen-containing vitiated air-flue gas mixture. To minimize the formation of NOx in the topping combustion unit and process, the topping combustor unit employs multi-staged combustion provided by successive fuel rich burn, fuel lean burn, and quench/dilution zones in the combustor unit. For the combustor unit, the combustible fuel gas enters the fuel rich zone and the vitiated air-flue gas mixture flows into each of the three combustion zones in an essentially fixed flow distribution design to achieve a desired combustion pattern/temperature profile through the combustor unit.

The topping combustor unit is constructed and supported in a manner that enables the air-flue gas mixture to envelope and cool the combustor unit walls. When more intense, localized cooling is needed, portions of the combustor unit are enclosed and high velocity cooling air is directed to flow along annular shaped channels provided by the combustor unit wall and the enclosure. In prior art combustors, this cooling air flow is not controlled but is a fixed percentage of the gas turbine compressor output and is discharged into the air-flue gas volume/plenum that surrounds the combustor. But for the present invention, this cooling air flow rate is made variable via the use of control device/valve means and also, the cooling air is discharged into the fuel rich and/or the rich burn and lean burn zones rather than mixing it with the entire air-flue gas flow to the combustor unit.

The air-flue gas mixture used in the combustor unit is provided to the combustor unit from a prior combustion step in the power plant process. If limited combustion has occurred in the prior step, there will be sufficient oxygen remaining in the air-flue gas mixture to achieve the desired fuel rich burn zone temperature range, and to complete the combustion process in the lean burn zone without overcooling the gases. However, if combustion in the prior combustion step is extensive and results in a low oxygen level in the air-flue gas mixture, it will not be possible to achieve the desired temperature profiles in the topping combustor unit (s). The large (as high as 98 percent) non-combustible portion of the air-flue gas mixture will absorb/quench the temperature rise associated with the combustion that occurs in the fuel rich and lean burn zones. Such overcooling in the rich burn zone will prevent the decomposition of fuel bound nitrogen components, i.e. ammonia, hydrogen cyanide, etc. to nitrogen, and thus lead to the excessive formation of nitrogen oxides in the lean burn zone. Overcooling the lean burn zone will terminate combustion reactions before completion, with the result being incomplete combustion as evidenced by high levels of carbon monoxide exiting from the combustor unit. To prevent such overcooling of the gases, the air flow being used to cool the combustor unit walls, which contains up to 12 times more oxygen than an equal amount of air-flue gas mixture, is increased so that it provides a greater portion of the oxygen required by the fuel rich zone, or by both the fuel rich and lean burn zones. Hence, the amount of low oxygen-containing air-flue gas mixture which flows into and tends to overcool these zones is reduced and both the desired combustion temperature pattern and excess oxygen concentration leaving the fuel rich and lean burn zones is achieved simultaneously.

The air-flue gas mixture will usually and preferably distribute itself in the combustor unit among the three burn zones in inverse proportion to their flow path resistances. After the flow distribution is established by the flow path geometry/orificing, it will remain relatively constant. Gas turbine power output is reduced by simultaneously reducing the fuel gas and air flow to the combustor unit until a minimum permissible air flow (typically 70 percent of normal) is reached. Thereafter, further reductions in gas turbine power output are achieved by reducing the fuel gas flow as the air flow remains constant. With the air-flue gas mixture and hence oxygen flowing to the rich burn zone now fixed at this power turndown flow condition, the fuel rich zone temperature will tend to rise as the fuel gas flow is further reduced. To keep the fuel rich zone within its desired temperature range, the augmented wall cooling air flow can be reduced to decrease the amount of oxygen flowing into the fuel rich zone, or to the fuel rich zone and lean burn zones. A control device/valve is installed in the augmented wall cooling air stream to regulate the cooling air flow to the fuel rich burn zone, or to the fuel rich and lean burn zones, as the combustion turbine firing temperature is reduced.

A gas turbine unit typically employs numerous burners. Although a control device/valve could be installed in the augmented wall cooling air stream for each burner zone to control air flow, it is preferred that only one or two devices/valves be provided that will control the total augmented cooling air flow to the combustor unit. After passing through the control devices/valve(s), the augmented wall cooling air flow will distribute itself substantially equally among the numerous burner flow paths via a proper sizing of the flow path resistances.

This invention advantageously provides a multi-stage topping combustion unit and method of operation incorporating variable casing wall cooling and three successive zones for fuel rich-burn, fuel lean burn, and quench/dilution steps. The variable wall cooling allows a preferred axial temperature profile to be maintained through the combustor unit as the firing temperature is reduced; especially with low oxygen-containing vitiated air streams; and maintaining this temperature profile in the combustor unit minimizes undesired topping combustor emissions of NOx and CO.

DESCRIPTION OF INVENTION

Figure 1:
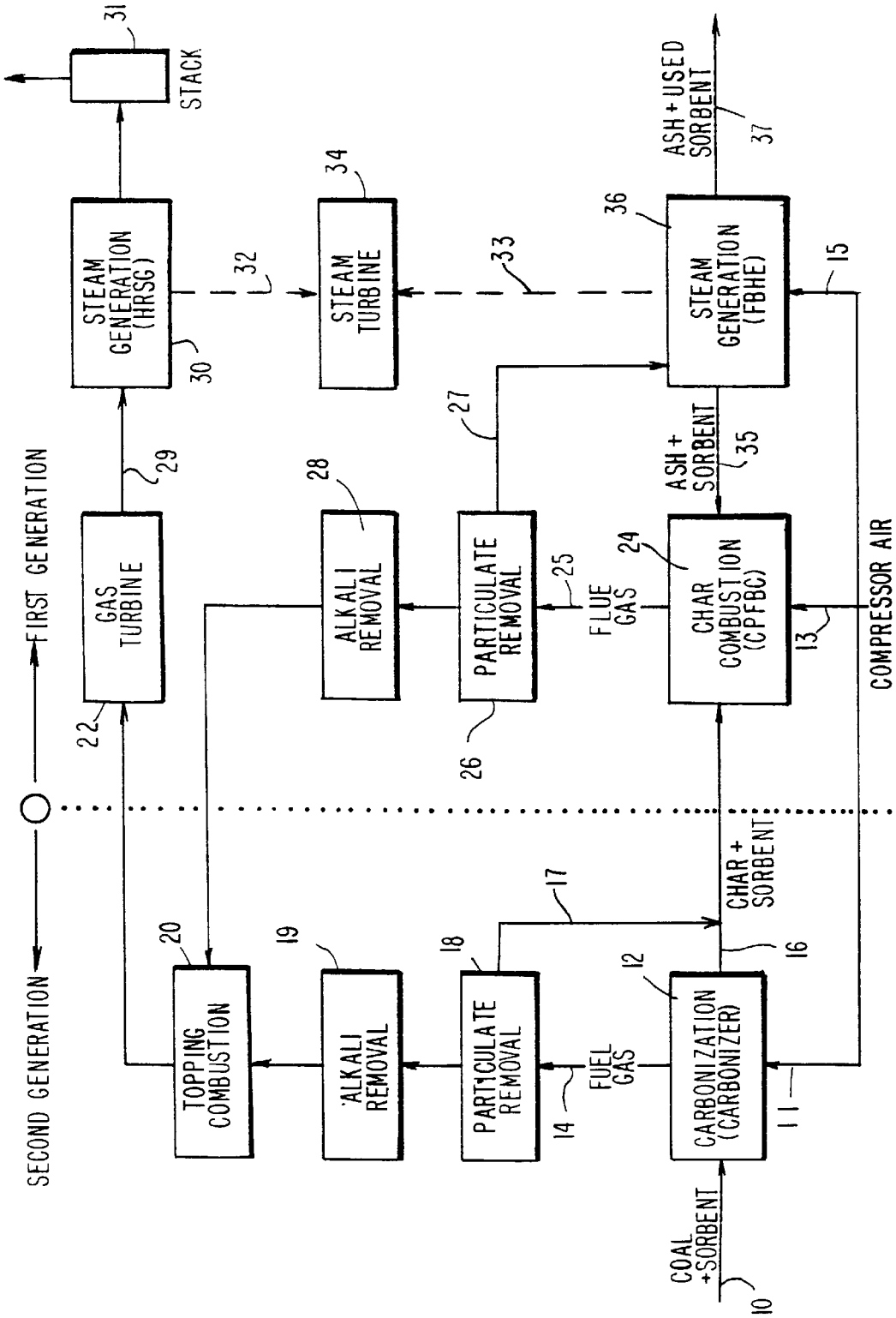
FIG. 1 is a schematic flow sheet of a pressurized fluidized bed combustion power plant process utilizing a topping combustion unit integrated with a gas turbine and a steam turbine.

As is generally shown in the FIG. 1 schematic flowsheet, an advanced second-generation pressurized fluidized bed combustion (PFBC) process has the major components all shown in block diagram form. Coal fuel plus a sorbent material such as lime are provided at 10 and fed together with compressed air at 11 to a fluidized bed carbonizer 12, from which a fuel gas is removed at 14 and char plus used sorbent material are removed at 16. After particulate solids removal from the fuel gas stream 14 in cyclone separators and/or filters at 18 and alkali removal at 19, the resulting cleaned fuel gas is passed to a topping combustor unit 20. The combustor unit 20 is provided near or within a gas turbine 22, so as to provide combustion gas to the turbine inlet at the desired high temperature and pressure conditions for efficient power output. Also, the char and sorbent material removed at 16 from the carbonizer 12, including particulate solids removed at 17, are fed together with compressed air at 13 and combusted in a char combustor 24 to provide an air-flue gas mixture at 25, which after uncombusted char particle removal at 26 as stream 27 and alkali removal at 28, this flue gas mixture is also passed to the topping combustor unit 20. Depending upon operating requirements, some coal and sorbent material at 10 can also be fed to the char combustor 24.

Thus, the topping combustor unit 20 is supplied with hot clean gases from the two sources for further combustion/heating in successive fuel rich burn, fuel lean burn and quench/dilution zones as explained below to provide desired gas temperatures upstream of the gas turbine 22. After the hot pressurized gases are expanded in the gas turbine 22 to produce mechanical power, the resulting hot exhaust gases at 29 are used to heat pressurized water/steam in steam generation unit 30 before being discharged to the atmosphere through stack 31. The resulting pressurized steam at 32 is expanded in steam turbine 34 to generate mechanical power in the usual manner. Additional pressurized steam for the steam turbine 34 is provided at 33 from a fluidized bed fuel combustion and steam generation unit 36, to which compressed air is provided at 15 together with the char particles from 27 and from which ash and spent sorbent material are withdrawn at 37.

Figure 2:
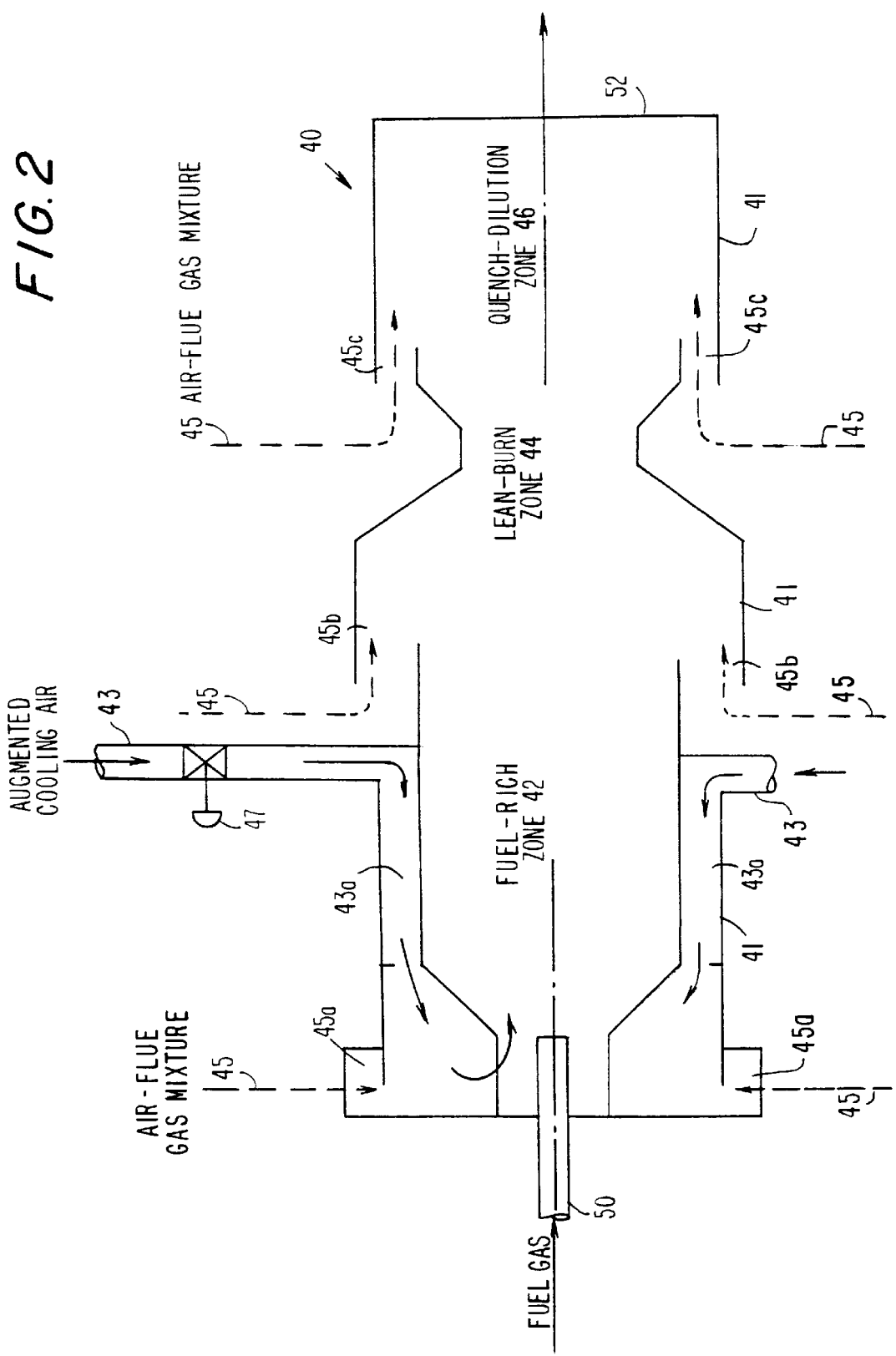
FIG. 2 shows a schematic cross-sectional view of a topping combustor unit including fuel rich burn, fuel lean burn, and quench/dilution zones arranged in series and operated according to one embodiment of the invention.

As further shown by FIG. 2, the topping combustor unit 40 utilized in the fluidized bed power plant process of FIG. 1 includes three adjacent zones, namely, a fuel rich burn zone 42, an intermediate fuel lean burn zone 44, a quench/dilution zone 46. The combustor unit 40 has generally cylindrical shaped outside casing walls 41 which are cooled with an oxygen-containing vitiated air stream such as from alkali removal step at 28 of FIG. 1 and provided as air-flue gas streams 45 which enter the fuel rich burn, fuel lean burn and quench-dilution zones through annular channels or passages 45a, 45b and 45c, respectively. The wall cooling and oxygen provided by vitiated air stream 45 is augmented by an air stream provided at conduit 43 and which enters the fuel rich burn zone 42 at its inlet end through valve 47 and annular-shaped passage 43a. The gaseous fuel such as gas mixture from alkali removal step at 19 of FIG. 1, is injected into the combustion unit 40 by an injector means 50 inserted into the forward or inlet end 51 of the fuel rich burn zone 42. The pressurized hot gas leaves the combustor unit 40 at open exit end 52 for expansion in a gas turbine for producing power.

Figure 3:
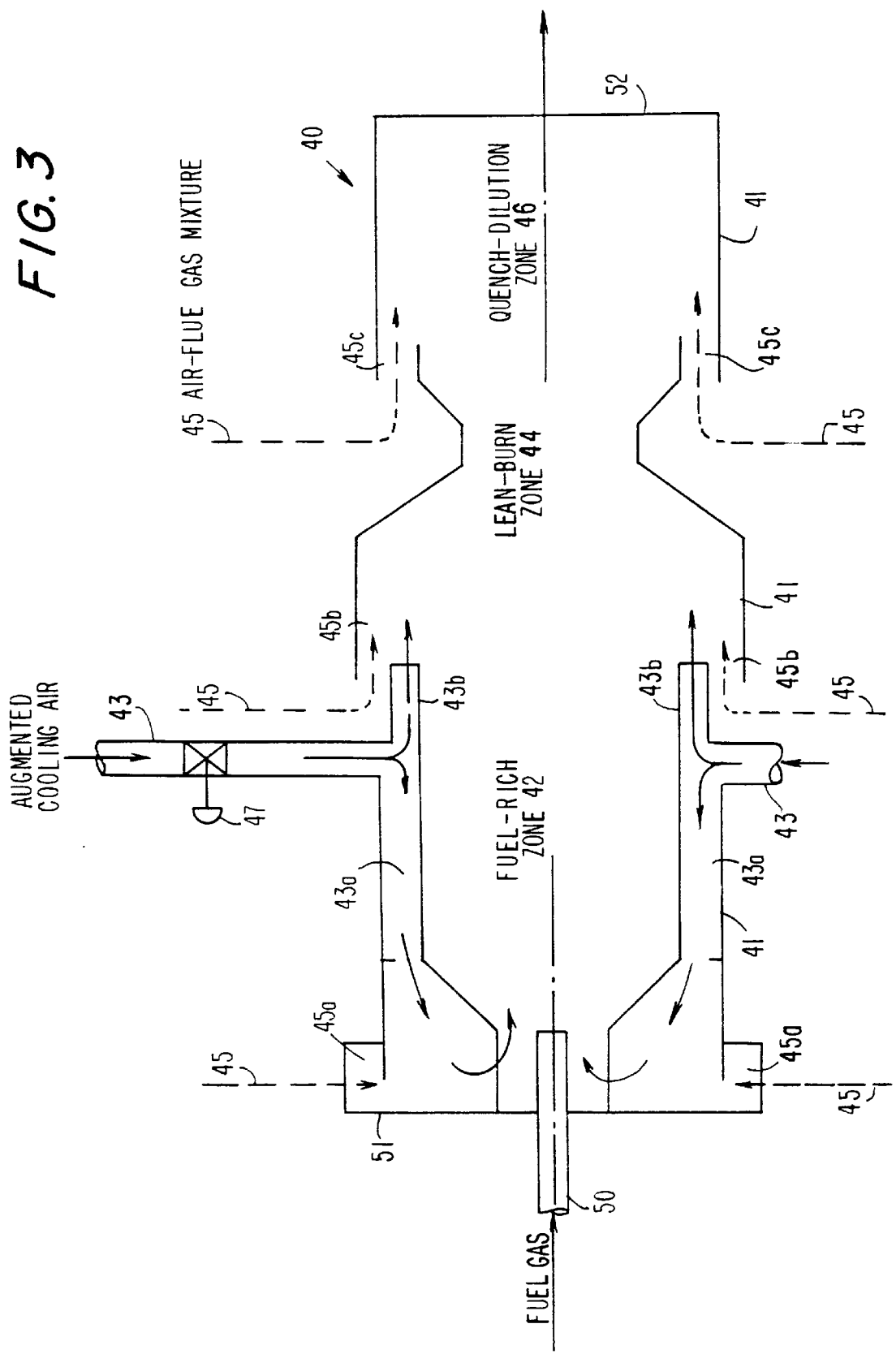
FIG. 3 shows another schematic cross-sectional view of a topping combustor unit including successive fuel rich burn, fuel lean burn, and quench/dilution zones operated according to another embodiment of the invention.

Alternatively, in another embodiment of the combustor unit 40 as shown by FIG. 3, the cooling air stream provided at conduit 43 can be controlled by valve 47 and used to augment both the wall cooling and oxygen flow to both the fuel rich zone 42 and the fuel lean fuel burn zone 44 through annular passages 43a and 43b, respectively. The air flow distribution through each annular passage 43a and 43b will be in inverse proportion to the flow path resistance provided in each annular passage.

Also, for the FIG. 3 embodiment, if desired to achieve finer control of the combustion temperatures in the fuel rich burn zone 42 and the fuel lean burn zone 44, a separate cooling air flow conduit and control valve could be provided in parallel with conduit 43 and valve 47 for supplying the cooling air separately to each annular passage 43a and 43b, respectively.

EXAMPLE

Exemplary operational characteristics are provided in Table 1 for a typical gas turbine power producing installation utilizing a topping combustor unit as shown in FIG. 3. For this example, the topping combustor unit is designed and orificed to distribute the vitiated air flow as follows: 2 wt. % to the fuel rich burn zone, 18 wt. % to the lean burn zone, and 80 wt. % to the quench/dilution zone. The combustor cooling air flow is augmented to serve both as a wall coolant stream and as a variable source of oxygen to both the fuel rich and lean burn zones of the combustor unit; flow distribution of the augmented cooling air flow is 50 percent to the rich burn zone and 50 percent to the lean-burn zone. After the cooling air flow to the gas turbine has been reduced to its minimum value, further reductions in gas turbine power output are achieved by reducing the fuel gas flow rate and, hence, the combustor firing temperature, as shown in the Table 1.

For a second-generation pressurized fluidized bed combustion power plant, reducing the fuel gas flow rate results in an increase in the flow rate of vitiated air. With the fuel gas flow rate decreasing and the vitiated air flow rate to the rich burn zone increasing, the rich burn zone temperature would normally tend to increase. However, by reducing the augmented combustor cooling air flow as shown in Table 1: (1) the rich burn zone temperature is prevented from rising, (2) substoichiometric/reducing gas conditions are maintained in the rich burn zone over the gas turbine operating envelope, and (3) rich and lean burn zones temperature are kept close to preferred values for minimizing NOx and carbon monoxide emissions.

The data presented in Table 1 are typical for a particular gas turbine, operating with a particular fuel gas, and a particular vitiated air flow characteristic. When any of these parameters are changed, i.e. the fuel gas quality, gas turbine firing temperature, etc., the combustor unit flow rates, flow distributions, oxygen levels, preferred rich and lean burn temperatures, etc. will also change from the indicated values in Table 1. However, the method of augmenting the gas turbine combustor cooling air flow and using it as a variable source of oxygen to the fuel rich burn zone (FIG. 2), or to both the fuel rich and lean burn zones (FIG. 3), can be advantageously used to control rich and lean burn zone temperatures and gas stoichiometries as the gas turbine load is reduced.

TABLE 1

Typical Topping Combustor Operating Conditions with Augmented Cooling Air Flow

| Gas Turbine Load | Full | Intermediate | Mininum |
|---|---|---|---|
| Combustor Outlet Temperature, °F. | 2100 | 1975 | 1800 |
| Vitiated Air | | | |
| Temperature °F. | 1550 | 1550 | 1550 |
| Oxygen Content wt % | 1.8 | 1.8 | 1.8 |
| Flow Rate M lb/h | 996 | 1066 | 1164 |
| Rich Zone % | 2 | 2 | 2 |
| Lean Zone % | 18 | 18 | 18 |
| Quench Zone % | 80 | 80 | 80 |
| Fuel Gas | | | |
| Temperature °F. | 1400 | 1400 | 1400 |
| Flow Rate M lb/h | 105 | 81 | 47 |
| Augmented Combustor Cooling Air | | | |
| Temperature °F. | 801 | 794 | 783 |
| Flow Rate M lb/h | 171 | 127 | 65 |
| Rich Zone % | 50 | 50 | 50 |
| Lean Zone % | 50 | 50 | 50 |
| Temperature | | | |
| Rich Zone °F. | 3050 | 2950 | 2750 |
| Lean Zone °F. | 2980 | 2787 | 2450 |
| Quench Zone °F. | 2100 | 1975 | 1800 |

Although this invention has been described broadly and in terms of a preferred embodiment, it is understood that modifications and variations can be made all within the scope of the invention which is defined by the following claims.

We claim:

1. A topping-combustor unit for use with a pressurized fluidized bed combustion process gas turbine, said combustor unit comprising:
   (a) an elongated casing including a fuel rich burn zone, a fuel lean burn zone, and a quench/dilution zone all arranged in successive fuel flow sequence in the casing;
   (b) nozzle means for injecting a combustible fuel gas into said fuel rich burn zone in said casing;
   (c) means for cooling said casing by a reduced oxygen-containing air-flue gas mixture being discharged into each of the fuel rich burn, fuel lean burn, and quench/dilution zones in said casing; and
   (d) means for augmenting the cooling of said casing by conveying a cooling air stream through annular-shaped passages formed with walls of the casing, and means for using that cooling air stream to augment the reduced oxygen content provided by the air-flue gas mixture discharged into the fuel rich burn zone; whereby the fuel gas is combusted so as to provide an axial combustion temperature profile designed to minimize formation of NOx and CO in the topping combustion unit of the combustion process despite the reduced oxygen concentration contained in the air-flue gas mixture.

2. The topping combustor unit of claim 1, wherein said casing annular-shaped passages are provided at the inlet end of the fuel rich-burn zone for providing the cooling air stream having an augmented oxygen content into said zone.

3. The topping combustor unit of claim 1, wherein said means for conveying the cooling air stream having an augmented oxygen content is provided into the fuel rich burn zone only.

4. The topping combustor unit of claim 1, wherein a control device/valve means is provided to regulate the cooling air stream flow through the casing wall annular-shaped passageways into the fuel rich burn zone.

5. The topping combustor unit of claim 1, wherein said casing annular-shaped passages are provided at the inlet end of both the fuel rich-burn zone and the fuel lean burn zone for providing the cooling air stream having an augmented oxygen content into each said zone.

6. The topping combustor unit of claim 1, wherein said means for conveying the cooling air stream having an augmented oxygen content is provided into both the fuel rich burn zone and the fuel lean burn zone.

7. The topping combustor unit of claim 1, wherein control device/valve means are provided to regulate the cooling air stream flow through the casing wall annular-shaped passageways into both the fuel rich burn zone and the fuel lean burn zone.

8. A topping combustor unit for use with a second generation pressurized fluidized bed combustion process gas turbine, said combustor unit comprising:
   (a) an elongated casing including a fuel rich burn zone, a fuel lean burn zone, and a quench/dilution zone arranged in successive fuel flow sequence in the casing;
   (b) nozzle means for injecting a combustible fuel gas into said fuel rich burn zone in said casing;
   (c) means for cooling said casing by a reduced oxygen-containing air-flue gas mixture being discharged into each of the fuel rich burn, fuel lean burn, and quench/dilution zones in said casing; and
   (d) means for cooling walls of said casing by conveying a cooling air stream through annular-shaped passageways provided at the inlet ends of the rich-burn and the lean burn zones within the casing wall, and means for discharging that cooling air stream into the inlet end of the fuel rich burn zone and the fuel lean burn zone through control valve means; whereby the fuel gas is combusted with the air-flue gas mixture so as to provide an axial combustion temperature profile selected to minimize formation of NOx and CO in the topping combustion unit of the combustion process despite reduced oxygen concentration levels in the vitiated air-flue gas mixture stream.

9. A method for operating a topping combustor unit provided in a gas turbine power plant process, comprising:
   (a) injecting a fuel gas into an inlet end of a topping combustor unit containing a fuel rich burn zone, a fuel lean burn zone, and a quench/dilution zone arranged in fuel gas flow sequence;

(b) providing an air-flue gas flow glow to the forward inlet end of each said zone; and (c) providing an augmented oxygen and cooling air flow to the forward inlet end of the fuel-rich zone or to the fuel rich and the fuel lean burn zones at a controlled variable flow rate, so as to control the combustion temperatures in each said zone and minimize production of NOx and CO gases in the combustor unit.

10. The combustion method of claim 9, wherein the air-flue gas mixture flow distribution to each said zone is in a relatively constant proportion, and the augmented oxygen and cooling air flow to said fuel rich zone or to the fuel rich and lean burn zones is varied directly as the fuel gas flow rate is varied.

* * * * *